(12) United States Patent
Tavernier et al.

(10) Patent No.: US 12,129,912 B2
(45) Date of Patent: Oct. 29, 2024

(54) CABLE CONVEYOR BELT JOINING DEVICE PROVIDED WITH CABLE LOCKING ELEMENTS

(71) Applicant: FP BUSINESS INVEST, Saint-Chamond (FR)

(72) Inventors: Bernard Tavernier, Le Chambon Feugerolles (FR); Frederic Guillemet, Caluire et Cuire (FR)

(73) Assignee: FP BUSINESS INVEST, Saint-Chamond (FR)

( * ) Notice: Subject to any disclaimer, the term of this patent is extended or adjusted under 35 U.S.C. 154(b) by 52 days.

(21) Appl. No.: 17/926,914

(22) PCT Filed: May 29, 2021

(86) PCT No.: PCT/EP2021/064465
§ 371 (c)(1),
(2) Date: Nov. 21, 2022

(87) PCT Pub. No.: WO2021/240008
PCT Pub. Date: Dec. 2, 2021

(65) Prior Publication Data
US 2023/0287960 A1    Sep. 14, 2023

(30) Foreign Application Priority Data
May 29, 2020    (FR) ...................................... 2005721

(51) Int. Cl.
*F16G 3/08*    (2006.01)
(52) U.S. Cl.
CPC ..................................... *F16G 3/08* (2013.01)

(58) Field of Classification Search
None
See application file for complete search history.

(56) References Cited

U.S. PATENT DOCUMENTS

2023/0115646 A1*  4/2023  Tavernier .................. F16G 1/08
                                                              198/844.2

FOREIGN PATENT DOCUMENTS

BE        531462 A     9/1954
DE       8801165 U1    3/1988
(Continued)

OTHER PUBLICATIONS

International Search Report and Written Opinion issued in corresponding International Application No. PCT/EP2021/064465, mailed Aug. 12, 2021, pp. 1-21, European Patent Office, Rijswijk, Netherlands.

*Primary Examiner* — William R Harp
(74) *Attorney, Agent, or Firm* — HAUPTMAN HAM, LLP

(57) ABSTRACT

A joining device for at least one conveyor belt of the type extending along a longitudinal axis and including a body made of flexible material inside which a reinforcement including reinforcing cables extending at least in part axially is accommodated. The joining device is intended to connect at least a first and a second end portion of the conveyor belt. The joining device includes at least one assembly of at least two locking elements connected to each other by assembly means includes at least one connecting cable. The assembly is intended to be attached to the first end portion and the second end portion of the conveyor belt, so as to connect at least some of the reinforcing cables of the first end portion of the conveyor belt to at least some of the reinforcing cables of the second end portion of the conveyor belt.

20 Claims, 7 Drawing Sheets

(56) References Cited

FOREIGN PATENT DOCUMENTS

| | | |
|---|---|---|
| GB | 191517364 A | 1/1920 |
| GB | 2118583 A | 11/1983 |
| WO | 2019071363 A1 | 4/2019 |

* cited by examiner

US 12,129,912 B2

CABLE CONVEYOR BELT JOINING DEVICE PROVIDED WITH CABLE LOCKING ELEMENTS

CROSS-REFERENCE TO RELATED APPLICATIONS

The present application is a U.S. National Phase of International Application Number PCT/EP2021/064465, filed May 29, 2021, which claims priority to French Application No. 2005721, dated May 29, 2020. Both of the aforementioned applications are hereby incorporated by reference in their entireties.

TECHNICAL FIELD OF THE INVENTION

The invention relates generally to the technical field of locking elements for at least one cable, such as cable clamps or cable locks.

The invention relates more specifically to a cable locking element intended to be fastened to at least one portion of at least one cable, the locking element comprising two supports configured to enclose the portion of the cable, locking it.

PRIOR ART

Numerous solutions are known from the prior art for fastening an element to a cable or locally connecting multiple cables together. A cable clamp, for example, is generally used to join two portions of several distinct cables, generally two, or to join two portions of the same cable, for example to make a closed loop with the corresponding cable. Fasteners are also used to dock onto a single portion of a cable, for example to fasten an accessory, such a configuration generally depending on the desired use. For example, in this case, it may be a handle for gripping a cable to assure its handling.

These fasteners are configured to clamp at least one portion of each of the cables between two supports, which are constrained relative to each other by a clamping means such as a bolt.

A disadvantage of these fasteners is that in some uses, excessive longitudinal tensile stress on the cable may cause the cable to slip relative to the fastener supports. In this case, it is known to dimension the fastener to ensure sufficient clamping of the one or more cables to avoid its relative slippage along the cable once subjected to tensile forces. This type of dimensioning generally leads to the design of bulky solutions that are incompatible with certain applications. An example of an application requiring a cable join of reduced size and high strength is that of conveyor belt joins reinforced with a cable armature.

It would also be possible to configure contact surfaces of said supports so that they have some relief or significant roughness to increase frictional forces, and thus adhesion between the cable and the clamping interface of the fastener supports. However, in practice, such configurations are likely to degrade the cable more quickly locally at the fastener, which is particularly problematic for certain uses where it is sought to improve the quality of the fastening while minimizing maintenance operations to replace a cable. In addition, these configurations do not solve the problem of the volume of the fasteners depending on the desired application.

Also in some applications, the attachment of one or more cables requires preparation of the one or more cable portions to be attached, which can be time-consuming and tedious. In the field of joins between two ends of a conveyor belt reinforced with a cable reinforcement, it is generally necessary to mobilize qualified people to carry out cable stripping operations in the vicinity of the end portions of the conveyor belt to be connected, which is very time-consuming to implement. Furthermore, once the join has been made, the joined cables must then be embedded in the constituent material of the belt body and a vulcanization operation is carried out to finish the join, this constituent material being a flexible and elastic material, for example made of vulcanized rubber, or a synthetic material such as polyurethane.

The implementation of these steps is particularly constraining. First of all, the multiplicity of operations necessitates a very long maintenance time, more than a day, even several days. In addition, the very severe operating conditions of the conveyor belt require careful work on the joins, which can only be done by highly qualified specialists. Due to the maintenance time, there is a need for several shifts of people, each of whom must be qualified. In addition, these joins require that the work be carried out over a very long length, usually between 5 and 10 meters. Since the vulcanizing operation must be performed in one step along the entire length of the join, it is necessary to have a vulcanizing press on site, usually at the location where the join is to be repaired, and to adapt it to the length of the join. The time and cost involved are very high.

Thus, there is a significant need for a person skilled in the art to arrive at a more effective solution than those proposed in the prior art to achieve a cable locking element that is intended to be fastened to at least one portion of at least one cable, is particularly strong and small in size, and preferably participates in an improved joining of two ends of a conveyor belt of the type having a body made of flexible material within which a reinforcement comprising cables is housed.

DESCRIPTION OF THE INVENTION

The object of the present invention is to propose a solution that addresses some or all of these technical problems, and in particular to propose a solution that has improved tensile strength characteristics, guarantees locking of the fastener to the cable while reducing the risk of premature cable wear, and is of a relatively reduced size.

To this end, the invention relates to a cable locking element intended to be fastened to at least one portion of at least one cable, the locking element comprising at least one support on a first side and one support on a second side opposite the first side, the supports being configured to enclose at least the portion of the cable, the supports each having at least one groove, together defining at least part of a through-cavity for receiving at least the portion of the cable passing through the locking element between an entrance opening and an exit opening aligned according to a reference axis, the locking element being characterized in that the cavity receiving the portion of the cable comprises a widened intermediate part, between entrance opening and exit opening portions, widened radially relative to the entrance opening portion and the exit opening portion, the locking element comprising at least one anchoring member configured to at least partially occupy a portion of the widened intermediate part of the cavity situated in alignment with the entrance and exit openings, so as to locally create a radial deformation of the section of the portion of the cable.

With such a combination of features, one or more cable portions are enclosed between the supports, and, for a given cable portion, it is possible to locally create a radial deformation of the section of the given cable portion by the introduction of the anchoring member. This deformation can then locally increase the gauge of the cable deformed by the anchoring member which is contained in the widened area of the intermediate part, which is itself axially framed by two portions of reduced section, one towards the entrance opening and the other towards the exit opening of the cable. The opening portions each form a portion of the cavity opening towards, or on the side of, the associated opening of the locking element. In a locked position of the cable portion in the locking element, the cable itself participates in the locking and, due to its radial deformation and consequently due to its size, comes to bear against these reduced sections and is locked between the entrance and exit opening portions.

According to an embodiment, the locking element comprises at least one clamping means for providing a clamping of the two supports relative to each other, Preferably, the clamping means comprises at least one screw and/or one cleat and/or one rivet and/or one crimp. Generally speaking, the clamping means(s) can be removable, which is the case in particular for the screw and the cleat.

According to one embodiment, the locking element is configured to enclose at least a first portion and a second portion of the same cable, or of two separate cables.

According to an embodiment, the clamping means comprises the anchoring member so that the anchoring member participates in the clamping of the two supports with respect to each other. In this way, the overall size of the locking element is minimized by providing both functions of clamping and anchoring by way of a single means.

According to one embodiment, the supports are formed as a single piece. In such a configuration, a portion of cable is obtained that is continuously surrounded by the supports. In this case, the supports can be discontinuous and distributed over at least two zones facing each other, for example, or linked together so as to form a circumferential clamp.

According to one embodiment, the anchoring member comprises a rod portion configured to penetrate the portion of the cable.

According to one embodiment, the anchoring member preferably comprises at least one cleat and/or one screw and/or one rivet and/or one pin.

In one embodiment, the portion of the cable comprises a structure of the type comprising wires, the anchoring member comprising a distal end, opposite a head, provided with a tip so as to at least partially penetrate the cable by separating the wires of the cable structure. The use of a tip facilitates the introduction of the anchoring member through the corresponding portion of the cable, without necessitating the use of specific tooling. This tip can be machined, for example bent, or cut after positioning of the anchoring member, depending on the configuration of the locking element.

According to an embodiment, at least a first of the two supports comprises at least one through-hole opening into the widened intermediate part of the cavity to allow the anchoring member to penetrate the widened intermediate part of the cavity.

According to an embodiment, the first of the two supports comprises at least one first interface, for example a depression or countersink, suitable for accommodating a head of one of the anchoring members, and in that a second of the two supports comprises at least one second interface with which an anchoring section of said anchoring member, for example a threading, is suitable for cooperation. Of course, these first and second interfaces are adapted to the associated anchoring member. This feature is all the more advantageous when the anchoring member forms, or constitutes, the clamping means itself, the interfaces making it possible to ensure the good holding of the anchoring member and the clamping means.

According to an embodiment, the entrance opening and/or the exit opening portion locally have a cross-sectional constriction, preferably configured such that this constriction has a diameter strictly smaller than the diameter of a cylindrical jacket of the cable. Such a feature is intended to ensure a clamping of the portion of the cable at the entry and exit of the locking element through the opening portions. Such a sectional constriction can be continuous or discontinuous around the circumference of the cylindrical jacket of the cable. Such a discontinuity can be formed, for example, by at least one tooth, or even a circumferential succession of teeth, capable of penetrating the given cable portion. A constriction can be continuous where it is formed by, for example, a flange or flange portion extending circumferentially with respect to said cable portion. Such a constriction can also be formed by a connected piece that would locally cap a part of the cable portion in the cavity, for example at the entrance and/or exit openings, or at portions of the entrance and/or exit openings thereof.

According to an embodiment, the widened intermediate part of the cavity has a radial widening in a plane orthogonal to an axis of a rod portion of the anchoring member configured to penetrate the cable. This axis preferably corresponds to the axis of insertion of the anchoring member through the cavity, preferably through the widened intermediate part. The radial widening is preferably greater than or equal to 10%, more preferably greater than or equal to 25% of a diameter of the cable, and preferably less than or equal to 50%, more preferably less than 40% of the diameter of the cable, on either side with respect to the cavity.

According to an embodiment, the entrance and exit opening portions of the cable-receiving cavity have a shape partially defining a cylindrical jacket configured to cooperate with a cylindrical jacket of the cable. Preferably in this case, the entrance and exit opening portions of the cavity each extend axially along a length greater than or equal to the axial length of the widened intermediate part of the cavity.

According to a second aspect, the invention also relates to an assembly of at least two cable locking elements, characterized in that it comprises at least a first and a second locking element having all or some of the characteristics described above, the first and second locking elements being connected to each other by assembly means.

According to an embodiment, the first and second locking elements are coupled in pairs so as to each form supports of a third locking element having all or some of the characteristics of a locking element as described above. Preferably in this case, the assembly means comprise the one or more clamping means to ensure a clamping of these two supports with respect to each other. In this case, the clamping means may also comprise or consist of the anchoring member.

According to an embodiment, the assembly of at least two cable locking elements is intended to join at least a first end portion and a second end portion of at least one cable, the assembly means successively connecting a plurality of locking elements, at least one of the locking elements being configured to be fastened to one of the two end portions and at least one other of the locking elements being configured to be fastened to the other of the two end portions. Preferably, the assembly means in this case comprise at least one connecting cable.

According to another aspect, the invention also relates to a joining device of at least one conveyor belt of the type extending along a longitudinal axis and comprising a body made of flexible material within which a reinforcement comprising cables extending at least in part axially is accommodated, the joining device being intended to connect at least one first and one second aligned end portions of the conveyor belt, the joining device being remarkable in that it comprises at least one assembly of locking elements having all or some of the characteristics described above and intended to be attached to the first end portion and the second end portion of the conveyor belt, so as to connect at least some of the reinforcing cables of the first end portion of the conveyor belt with at least some of the reinforcing cables of the second end portion of the conveyor belt.

In other words, the invention also relates to a joining device of at least one conveyor belt of the type extending along a longitudinal axis and comprising a body made of flexible material within which a reinforcement comprising reinforcing cables extending at least in part axially is accommodated, the joining device being intended to connect at least a first and a second end portion of the conveyor belt, the joining device being characterized in that it comprises at least one assembly of at least two locking elements connected to each other by assembly means, the assembly means comprising at least one connecting cable, the assembly being intended to be attached to the first end portion and the second end portion of the conveyor belt, so as to connect at least some of the reinforcing cables of the first end portion of the conveyor belt to at least some of the reinforcing cables of the second end portion of the conveyor belt, each cable locking element comprising at least two opposing supports configured to enclose at least the portion of an associated one of the reinforcing cables and the connecting cable, the supports each having at least one groove together defining at least a portion of a through-cavity for receiving at least the portion of the associated cable passing through the locking element between an entrance opening and an exit opening aligned according to a reference axis, the cavity comprising a widened intermediate part between entrance and exit opening portions, radially widened with respect to the entrance opening portion and the exit opening portion, the locking element comprising at least one anchoring member configured to at least partially occupy a portion of the widened intermediate part of the cavity situated in the alignment of the entrance and exit openings, so as to locally create a radial deformation of the section of the portion of the associated cable. According to one embodiment, some or all of the cable locking elements have some or all of the above features.

According to an embodiment, the joining device comprises at least two joining plates configured to each cover a separate side of the end portions of the conveyor belt such that the end portions of the conveyor belt are disposed between the two joining plates, the joining plates being fastened together by fastening means arranged to pass through respectively a joining plate, one of the ends of the conveyor belt and then the other joining plate, each joining plate being made of a flexible and resilient material and comprising the locking element assemblies as described above, preferably embedded at least partially in the flexible and resilient material of the corresponding joining plate.

According to an embodiment, the joining device comprises at least:

an upper longitudinal assembly of at least two upper locking elements of the locking elements, connected together by an upper connecting cable of the connecting cables to straddle both ends of said reinforcing cables to be connected, and a lower longitudinal assembly of at least two lower locking elements of the locking elements, connected together by a lower connecting cable of the connecting cables to straddle both ends of said reinforcing cables to be connected, the upper locking elements of the upper longitudinal assembly being shaped to be assembled with the lower locking elements of the lower longitudinal assembly, forming together a joining assembly, and to enclose at least some of the reinforcing cables of the first end portion of the conveyor belt and at least some of the reinforcing cables of the second end portion of the conveyor belt, the joining device preferably comprising a plurality of joining assemblies arranged in parallel to each other and configured to be evenly distributed across the join.

According to an embodiment, some of the assembly means are constituted by some of the fasteners, which are arranged to pass through respectively one joining plate, one of the ends of the conveyor belt and then the other joining plate.

According to an embodiment, in an enclosed position of the reinforcing cables of the first end portion and the second end portion, the reinforcing cables are arranged in a manner parallel to each other, and parallel to the longitudinal reference axis of the locked connecting cable portions with their corresponding locking element.

According to an embodiment, support parts of the locking element are configured to enclose at least the portion of a first cable from the reinforcing cables and the connecting cable, the locking element comprising a groove defining at least part of a through-cavity for receiving a second cable from the reinforcing cables and the connecting cable, the through-cavity having two axial end openings.

According to an embodiment, the fasteners each comprise a head and an anchoring section, the joining plates having at least first interfaces for cooperating with the heads of the fasteners and/or second interfaces for cooperating with the anchoring sections of the fasteners, the joining plates being arranged to mate with each other. Preferably the first and second interfaces are carried by locking elements of at least one of the assemblies accommodated in the corresponding joining plate.

According to an embodiment, each locking element makes it possible to fasten three different cable portions extending longitudinally generally in parallel two by two, of which a central cable forming a connecting cable passes through the locking element longitudinally and two reinforcing cables to be blocked by an anchoring member are configured to at least partially occupy a portion of the corresponding intermediate part.

According to another aspect, the invention also relates to a conveyor belt join extending along a longitudinal axis comprising a body made of flexible material within which a reinforcement comprising cables extending at least in part axially is accommodated, the conveyor belt having first and second end portions connected together by a joining device, the join being characterized in that the joining device comprises at least one assembly of locking elements having all or some of the characteristics described above and attached to the first end portion and the second end portion of the conveyor belt, so as to connect at least some of the reinforcing cables of the first end portion of the conveyor belt to at least some of the reinforcing cables of the second end portion of the conveyor belt.

According to one embodiment, the join comprises at least one assembly of locking elements, preferably a plurality, connecting all of the reinforcing cables of the first end portion of the conveyor belt to all of the reinforcing cables of the second end portion of the conveyor belt.

According to one embodiment, the join comprises a plurality of axially aligned locking element assemblies, each of the assemblies having an axial offset from at least one adjacent assembly, the axial offset preferably being greater than or equal to the axial length of a locking element.

According to another aspect, the invention also relates to a method for producing a conveyor belt join as described above, characterized in that it comprises at least the following steps:

stripping an upper part and a lower part of the conveyor belt body at the first end portion and the second end portion of the conveyor belt;

placing at least one assembly of locking elements so as to connect at least some of the reinforcing cables of the first end portion of the conveyor belt to at least some of the reinforcing cables of the second end portion of the conveyor belt.

According to an embodiment, the production method comprises at least one step of placing at least two joining plates each covering a separate side of the first and second end portions of the conveyor belt so that the first and second end portions of said conveyor belt are disposed between the two joining plates, the joining plates preferably being formed of a vulcanizable material, the step of placing the joining plates preferably being concomitant with the step of placing at least one locking element assembly.

BRIEF DESCRIPTION OF THE FIGURES

Further features and advantages of the invention will become apparent from the following description, with reference to the appended figures, which illustrate.

For clarity, the same or similar elements are denoted by identical reference signs throughout the figures.

Figure 1:
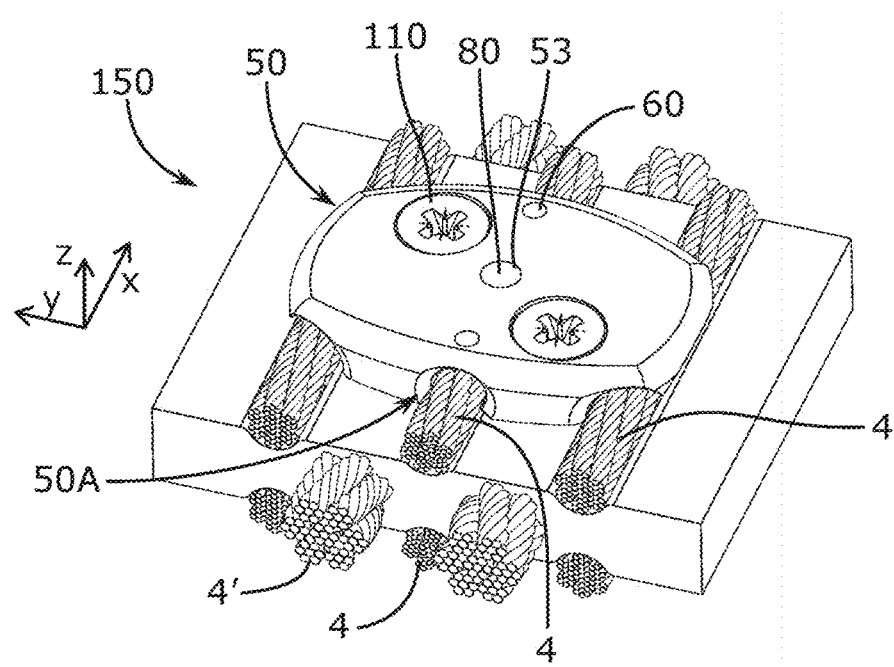
FIG. 1 an isometric view of an assembly of two locking elements according to a first embodiment of the invention.
Figure 2:
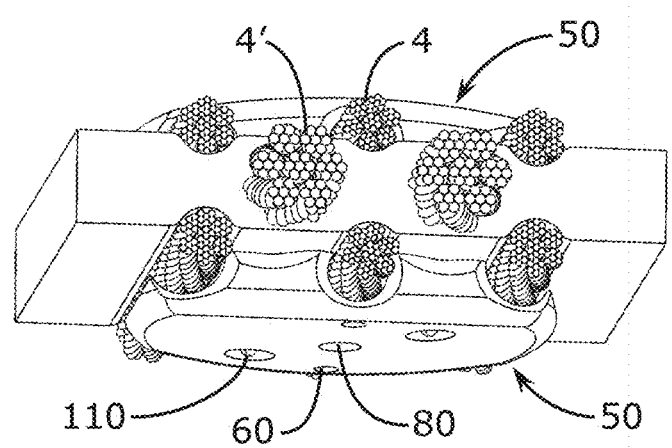
FIG. 2 a perspective view from below of the assembly according to this first embodiment.

In the description and claims, to clarify the description and the claims, the terminology longitudinal, transverse, and vertical will be adopted on a non-limiting basis with reference to the X, Y, Z or X', Y', Z' trihedrons shown in the figures.

DETAILED DESCRIPTION OF AN EMBODIMENT

With reference to FIGS. 1, 2, 3, 4 and 5, the figures illustrate an assembly 150 of two locking elements 50 according to a first embodiment of the invention.

The illustrated assembly 150 comprises two locking elements 50 for cables 4, a first upper locking element 50, and a second lower locking element 50, which are vertically superimposed. Each locking element 50 for a cable 4 ensures its locking with respect to a portion 40 of a cable 4. Preferably, the locking elements 50 are formed, or made, of metallic material(s). To ensure this fastening, each locking element 50 comprises a body passed through by a cavity 70 configured to receive at least the portion 40 of the cable 4, the cavity 70 passing through the body from one side to the other between an entrance opening 50A on the one hand, and an exit opening 50B on the other hand, these openings being aligned according to a longitudinal reference axis X.

The cavity 70 is configured to enclose the portion 40 of cable 4 along all or part of its length. To this end, and in general, the locking element 50 comprises at least one support 51 on a first side and a support 52 on a second side opposite the first side, the supports 51, 52 being configured to enclose at least the portion 40 of the cable 4. Each of the supports 51, 52 has a groove 71, 72 together delimiting at least a part of the cavity 70 and accommodating the portion 40 of cable 4. In this embodiment, the body of the locking element 50 through which the cavity 70 passes from one opening 50A to the other 50B is a monobloc part, so that the supports 51, 52 are formed together in a single piece. The cavity 70 is thus here open axially longitudinally at the entrance openings 50A and exit openings 50B, the cavity 70 being closed radially by the supports 51, 52 so that the grooves 71, 72 meet to form a closed contour surrounding the portion 40 of cable 4.

The cavity 70 of each of the two locking elements 50 receiving the portion 40 of the cable 4 comprises a widened intermediate or central part 73, which is disposed between entrance opening 50A portions and exit opening 50B portions, radially widened with respect to the entrance opening 50A portion and with respect to the exit opening 50B portion. This widened intermediate part 73 is disposed in alignment with the entrance opening 50A portion and exit opening 50B portion, i.e., said widened intermediate part 73 lies on the longitudinal reference axis X, here centered on this axis X, but it may optionally be off-center. The opening portions form generally longitudinally extending portions of the cavity 70 that open with respect to the locking element 50 through the associated aperture 50A, 50B.

Each locking element 50 is provided with at least one anchoring member 80 configured to at least partially occupy a portion of the widened intermediate part 73 of the cavity 70, so as to locally create a deformation 45 of the section of the portion 40 of the cable 4 along at least one radial component. As can be seen, for example, in FIG. 4, the anchoring member 80 is here formed by a rectilinear rod with a portion 83 of the rod 80 penetrating the widened intermediate part 73. When a portion 40 of the cable 4 is housed in the cavity 70, this rod 80 passes through it locally, preferably radially here with respect to the longitudinal reference axis X. The cable 4 comprises a structure having a core 41 surrounded by strands 42, each of the strands 42 and the core 41 consisting of wires 43. The rod of the anchoring member 80, by penetrating the cable 4, locally separates a part of the wires 43 of the structure of the cable 4 from another part, these two parts of wires 43 being spaced outwardly with respect to the anchoring member 80, creating locally a swelling, i.e., an increase in the gauge of the portion 40 of the corresponding cable 4.

This swelling extends relative to a substantially cylindrical jacket of the cable 4 along a generally radial component and in two opposite directions, i.e., along a transverse axis Y, which is perpendicular to the longitudinal axis X and to a vertical axis A of the rod of the anchoring member 80, thereby creating a transverse deformation 45 of the initially cylindrical section 40 of the cable 4 generally along this transverse axis Y', in one direction and in the other. Each of the locking elements 50 is configured so that this deformation 45, once the anchoring member 80 is positioned, comes into contact with and abuts at least part of the inner walls defining the widened intermediate part 73 of the cavity 70.

This insertion of the rod 80 into the cable is facilitated when the anchoring member 80 comprises a distal end 82, opposite a head 81, provided with a tip 820 so as to penetrate at least partially into the cable 4 by progressively separating the wires 43 from the structure of the cable 4. This tip 820 is preferably rounded so as to allow the wires 43 to be separated from the structure without affecting their structural integrity. A radius of curvature of the rounding is then chosen so as to facilitate the separation of the wires 43 without damaging them.

Figure 4:
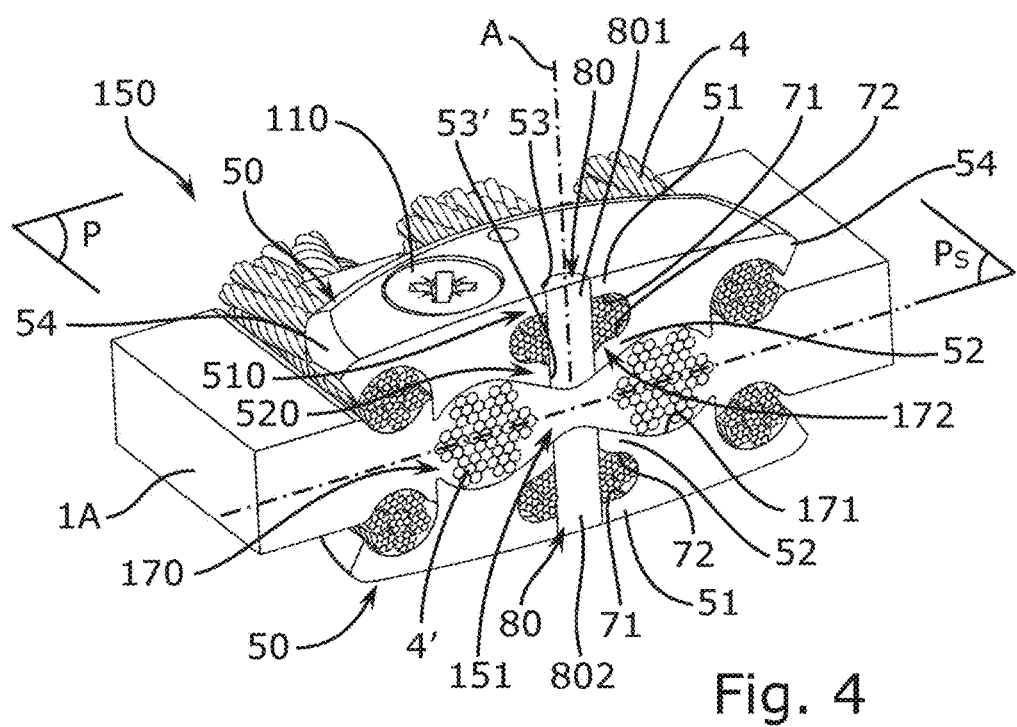
FIG. 4 a cross-sectional view of the same assembly according to this first embodiment.
Figure 5:
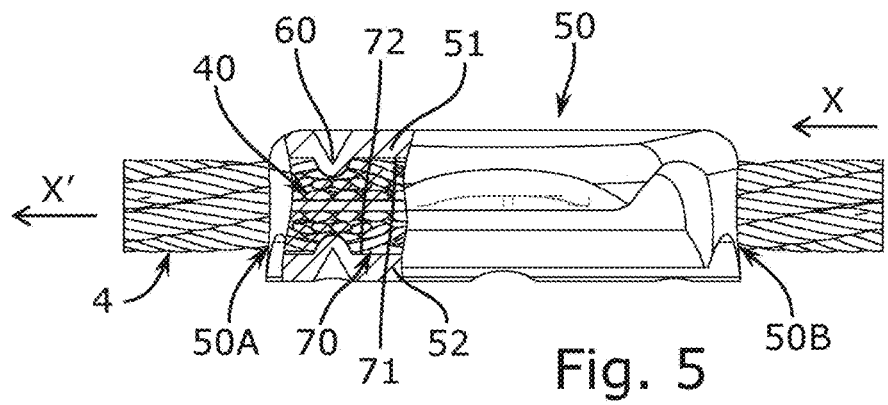
FIG. 5 a cut-away side view of the same assembly according to this first embodiment.

In order to allow the placement of this rod 80, one of the two supports 51, 52 accessible from the outside comprises a through-hole 53 opening into the widened intermediate part 73 of the cavity 70 to allow the engagement there of a first rod 801, and thus to allow said rod 801 to penetrate, here in translation, into the widened intermediate part 73 of the cavity 70 (see FIG. 4). The other of the two supports 51, 52 also comprises a second hole 53', for example a through-hole as shown, but not necessarily a through-hole, in order to receive the tip 820 of a second rod 802 and hold it. This second hole 53' is disposed opposite the through-hole 53, radially with respect to the longitudinal axis X of the cable 4. The rod 80, 801, 802 is held integrally with the locking element 50 by being shrunk fit into each of the two holes 53, 53' successively in the direction of insertion during its positioning. Since the holes 53, 53' integrally house the rod 801, 802 forming here the anchoring member 80, the hole 53 forms a first interface 510 capable of housing the head 81 of the anchoring member 80, and the hole 53' forms a second interface 520 with which it is capable of cooperating with an anchoring section 84 of said anchoring member 80. In this embodiment, the two rods 801, 802 form separate anchoring members 80 for one each of the locking elements 50 under consideration, but it could alternatively be envisaged that the same rod be common to the two locking elements 50 vertically superimposed.

The cavity 70 receiving the portion 40 of cable 4 has, at its ends, in the vicinity of each of the entrance openings 50A and exit openings 50B, a shape defining a cylindrical jacket configured to cooperate with a cylindrical jacket of said cable 4. The supports 51, 52 being formed in one piece and completely surrounding the portion 40 of cable 4, the longitudinal ends of the cavity 70 are formed by cylindrical portions which form the opening portions and which are complementary to this cable 4, or even of slightly smaller diameter so as to allow a light clamping increasing the frictional forces between the cable 4 and the corresponding groove 71, 72 of the cavity 70. In this configuration, the cable 4 is sufficiently enclosed so as not to be loosely disposed in the cavity 70, but not too tightly, so as to allow the cable 4 to be inserted through said cavity 70 by a manual operation performed by an operator, preferably without the aid of any specific tooling. Additional clamping means 60 can be provided to ensure a clamping of the two supports 51, 52 with respect to each other. In this example, a crimping 60 is provided at each of the entrance and exit openings 50A, 50B, the crimping being obtained by a stamping of one of the supports on an outer surface, creating a deformation of protruding material inside the cavity 70, in the corresponding groove 71, 72, as can be seen in particular in FIG. 5. Of course, any type of crimping can be used to form a clamping means according to the configuration of the locking element 50.

These cylindrical end portions of the cavity 70, or opening portions, open axially to the entrance and exit openings 50A, 50B. These opening portions each extend axially along a length $I_{50A}$ and $I_{50B}$, each of which is less than or equal to the axial length $L_{73}$ of the widened intermediate part 73 of the cavity 70.

Figure 3:
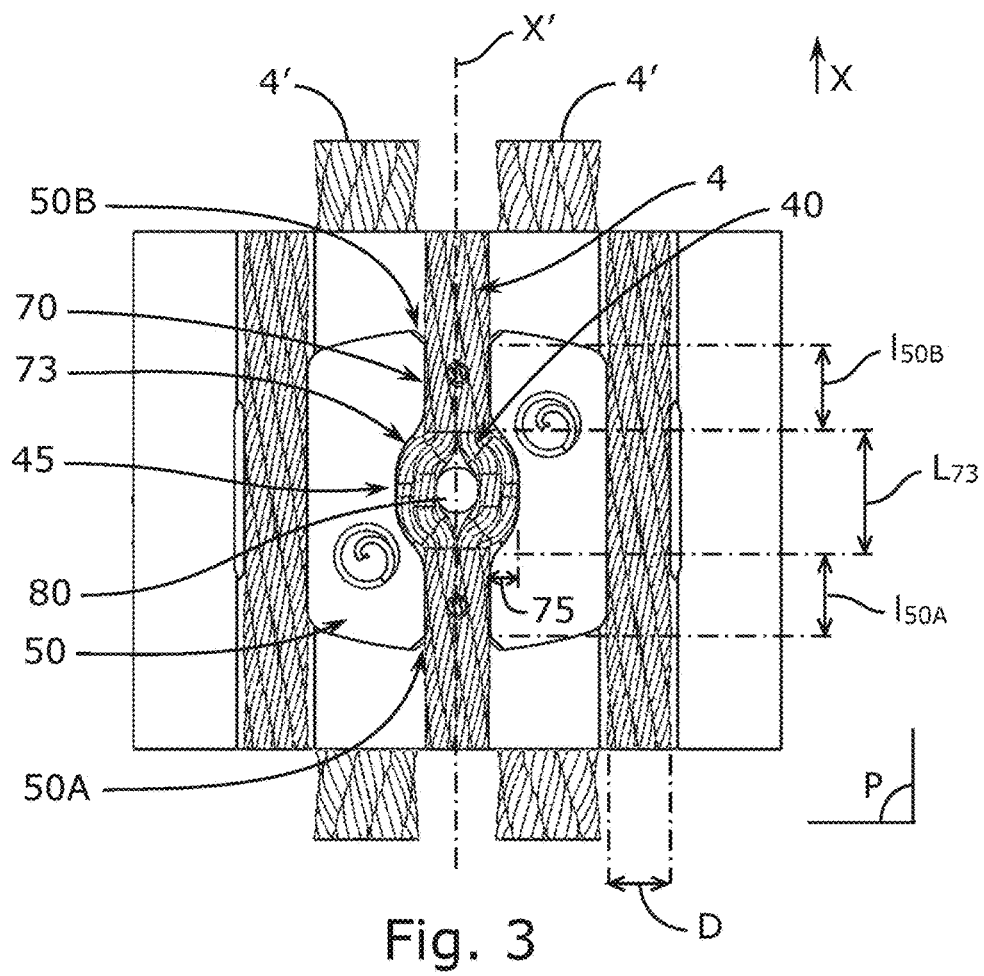
FIG. 3 a horizontal cross-sectional view from above of this assembly according to this first embodiment.

As can be seen, for example, in FIG. 3, the widened intermediate part 73 of the cavity 70 has a radial widening 75 extending generally along a plane P orthogonal to the axis A of the rod portion 83 of the anchoring member 80 configured to penetrate the cable 4. This transverse widening 75 of the cavity is preferably greater than or equal to 10%, more preferably greater than or equal to 25% of a diameter D of the cable 4, and preferably less than or equal to 50%, more preferably less than 40% of the diameter D of the cable 4, on each side with respect to the cavity 70 (see, for example, FIG. 3). For example, for a cable 4 of 5 mm diameter, passed through substantially in the middle by a rod 83 of 3 mm diameter, the cable 4 will have a bulge on either side of the rod 83, this bulge being directed generally transversely with respect to the longitudinal reference axis X of the cavity 70, in one direction and in the other. The widened intermediate part 73 of the cavity 70 is then configured to have a transverse widening 75 configured to accommodate this bulge therein, and to have a dimension corresponding to 30% of the diameter D of the cable 4 on either side of the axis A.

In such a configuration, each of the locking elements 50 makes it possible to keep a portion of cable locked thanks, on the one hand, to the frictional forces of the locking element 50 locally with the portion 40 of cable 4, in particular between the supports 51, 52 completed by the complementary clamping means 60, and, on the other hand, to the deformation 45 of the portion 40 of cable 4 ensured by the anchoring member 80. This deformation 45 of the cable is made possible by the internal widening 75 of the cavity 70 at the level of the portion of the widened intermediate part 73 arranged between two portions of smaller sections of the cavity 70 which lock the cable 4 in axial translation.

As discussed above, this first embodiment illustrates an assembly 150 provided with two cable locking elements 50 vertically assembled along a vertical axis Z: a first upper locking element 50 is configured to couple with a second lower locking element 50, connected together by fasteners 110.

This pair of lower and upper locking means 50 is configured to enclose between them at least one other cable portion 4', preferably two adjacent cables 4', as illustrated in FIGS. 1 to 6. In this manner, the first and second lower and upper locking elements 50 together form clamping laws configured to enclose these two cables 4' in an interior space 151 of the assembly 150. In a configuration not particularly illustrated in these figures, it should be noted that such clamping jaws can form supports 51, 52 of the same locking element 50 within the meaning of the present invention: in this case the two supports 51, 52 are not formed in one piece, but in two separate parts and the fasteners 110 then constitute clamping means 60.

The cavities 70 of each of the locking elements 50 are positioned, in an assembled position of the first and second lower and upper locking elements 50, so as to be substantially parallel, and in particular symmetrical with respect to a clamping plane Ps. These cavities 70 of each of the lower and upper clamping elements 50 are positioned aligned in a vertical plane, parallel to the longitudinal axis X of the two locked portions 40 of cables 4 and perpendicular to the clamping plane Ps. The two cables 4' enclosed between the two lower and upper locking elements 50 are arranged parallel to each other, parallel to the longitudinal reference axis X of the two portions of cables 4 locked with their corresponding locking element 50, and parallel to the associated lower and upper connecting cables.

The two cables 4' enclosed by the jaws 50 of the assembly 150 are off-center with respect to the aforementioned vertical plane and positioned symmetrically with respect to this vertical plane. The lower and upper locking elements 50 each have, on the inner side directed toward the inner space 151, a groove 171 each receiving one of the cables 4' in support. The grooves are associated in pairs of one groove each of the lower and upper locking elements 50. The grooves 171 in the pair are vertically aligned or superimposed and together define at least a part of a through-cavity 170 for receiving the corresponding portion of the cable 4' passing through the assembly 150 between two axially open openings. Thus, two cavities 170 are formed between the jaws forming an interface to enclose the corresponding cable portions 4'. Again, in a configuration not shown in these figures, each of the two cavities 170 could form in one embodiment a cavity also having a widened intermediate part in the sense of the invention.

The lower and upper locking elements 50 each have on the inner side a bulge 172 facing the inner space located substantially in line, vertically, with the corresponding cavity 70 and extending substantially longitudinally between the two entrance and exit openings 50A, 50B. This makes it possible to provide an excess thickness allowing a sufficient amount of material to receive an end of the anchoring member 80 and ensure its anchoring, here to ensure a hole 53' sized so as to ensure the proper bracing of the end of the rod 83. Such a bulge 172 may, in general, be located just in line with the widened intermediate part 73 of the cavity 70 without necessarily extending longitudinally. However, in the case of such a jaw, a bulge 172 that continues longitudinally makes it possible to delimit at least a portion of a groove, in this case the two grooves on either side transversely.

The hole 53' forming the second interface 520 of each of the two locking elements 50 with which an anchoring section 84 of said anchoring member 80 is adapted to cooperate and receiving the tip 520 of the rod 83 has an edge transitioning into the widened intermediate part 73 of the cavity 70. This transitioning edge is configured so as to have a rounding over its entire circumference. In this way, when the portion 40 of cable 4 is pressed against the groove 72 of the inner support 52, which is the support located on the inner side of the locking element 50 forming a jaw, i.e., closest to the inner space 151, when the anchoring member 80 is inserted, the cable 4 is pressed radially against the cavity 70, in particular against the inner wall in the widened intermediate part 73, and comes into contact with this rounding and not with a sharp circumferential edge, thus limiting its wear.

Figure 6:
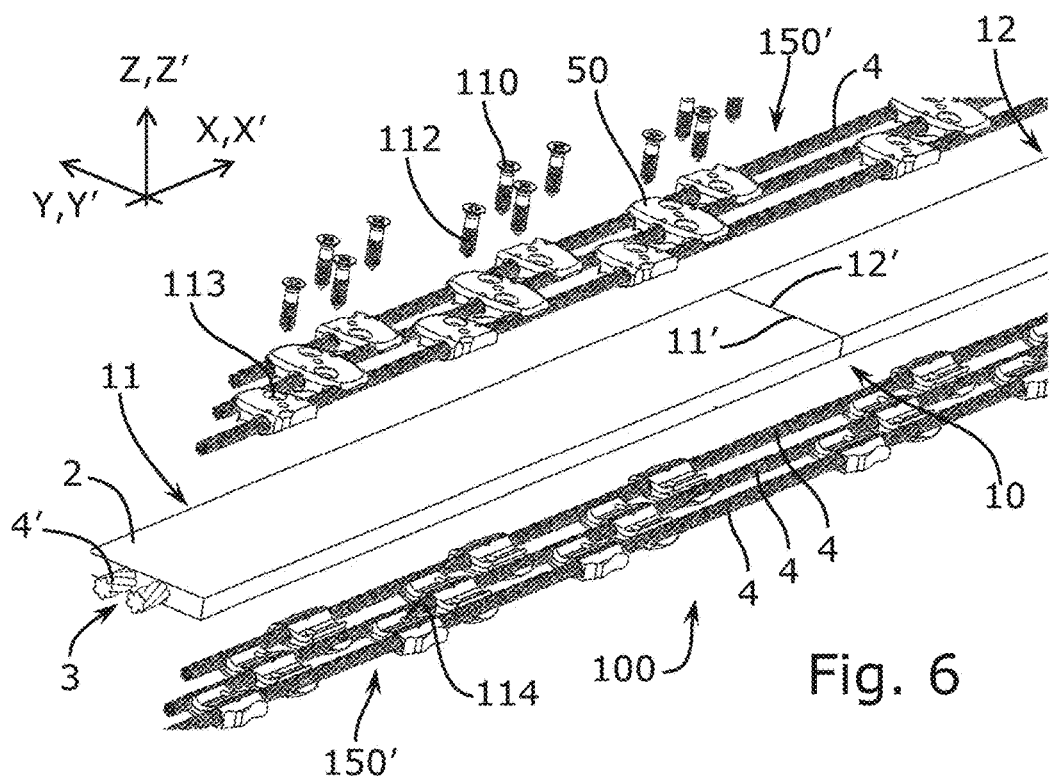
FIG. 6 an exploded isometric view of a part of a conveyor belt join comprising joining element assemblies according to this first embodiment.
Figure 7:
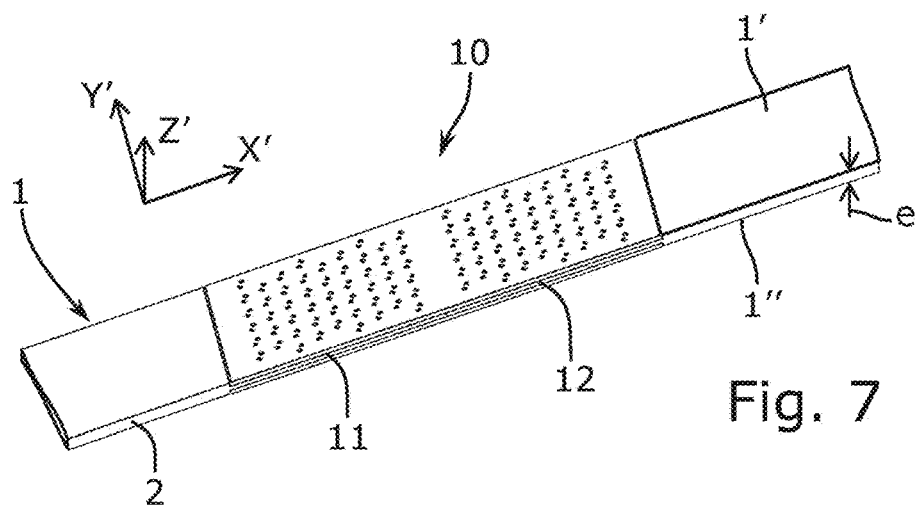
FIG. 7 an isometric view of this conveyor belt join according to this first embodiment, in a joining position.
Figure 8:
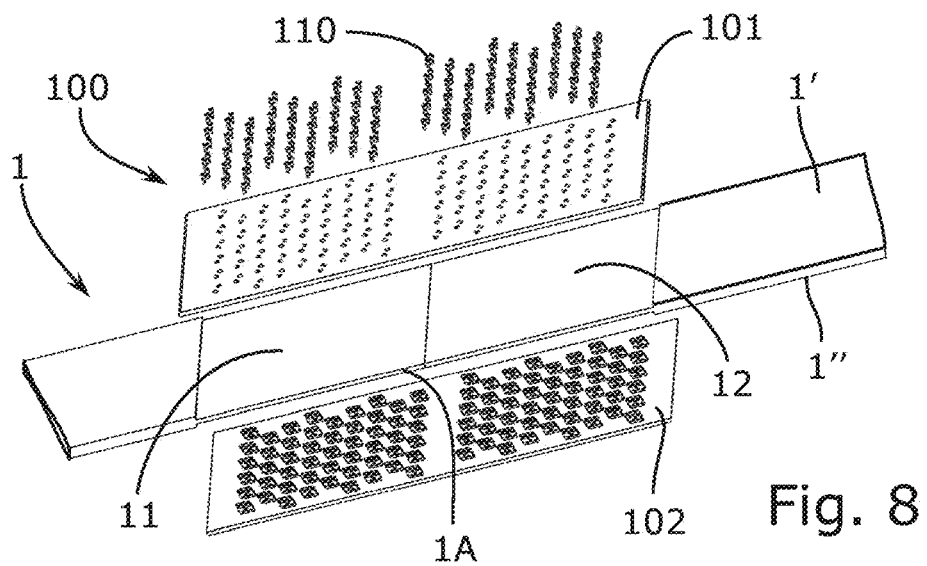
FIG. 8 an exploded isometric view of a conveyor belt join comprising joining element assemblies according to this same first embodiment.
Figure 9:
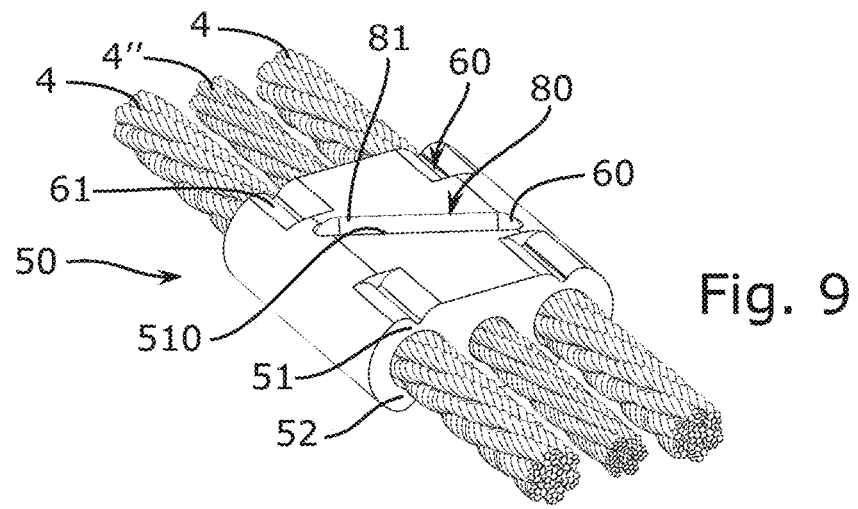
FIG. 9 an isometric view from above of a locking element according to a second embodiment of the invention.
Figure 10:
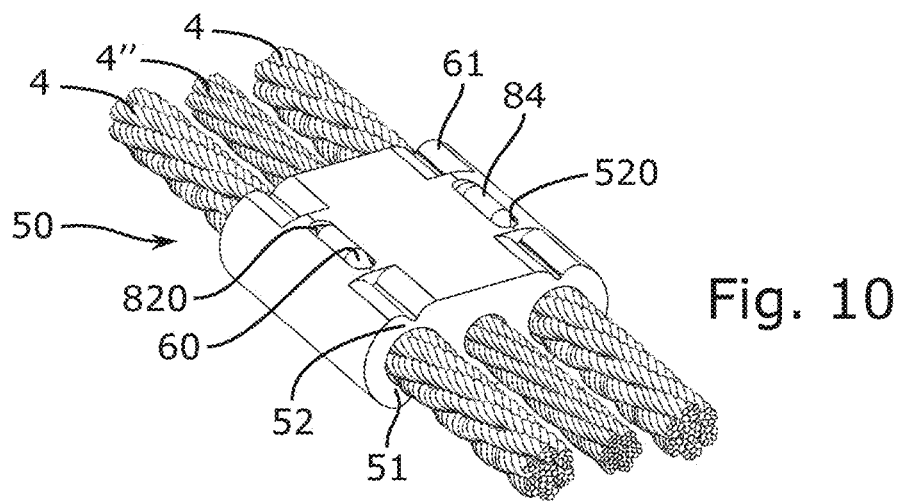
FIG. 10 an isometric view from below of the locking element according to this second embodiment.
Figure 11:
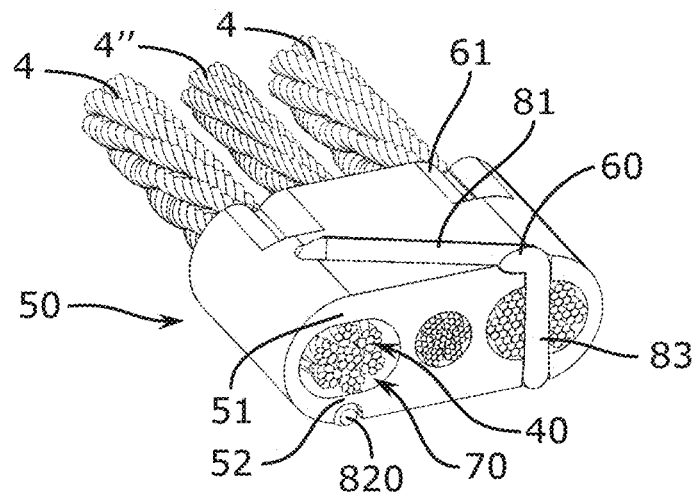
FIG. 11 a cross-sectional view of FIG. 9.
Figure 12:
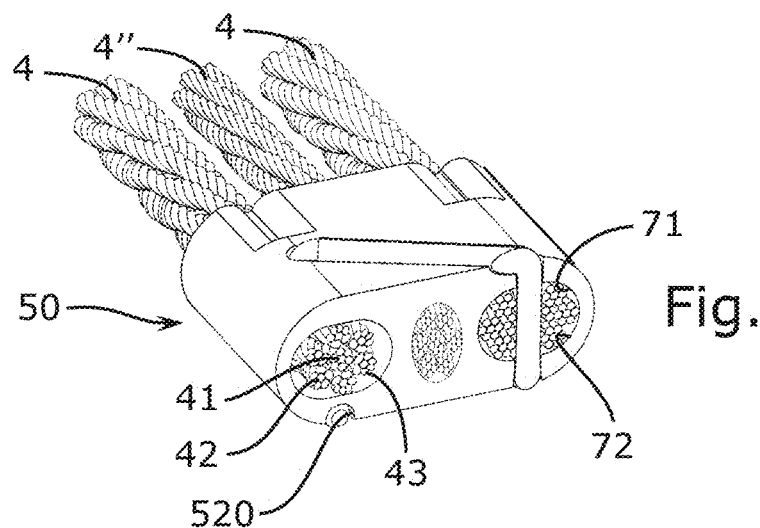
FIG. 12 a cross-sectional view of a locking element according to a variant.
Figure 13:
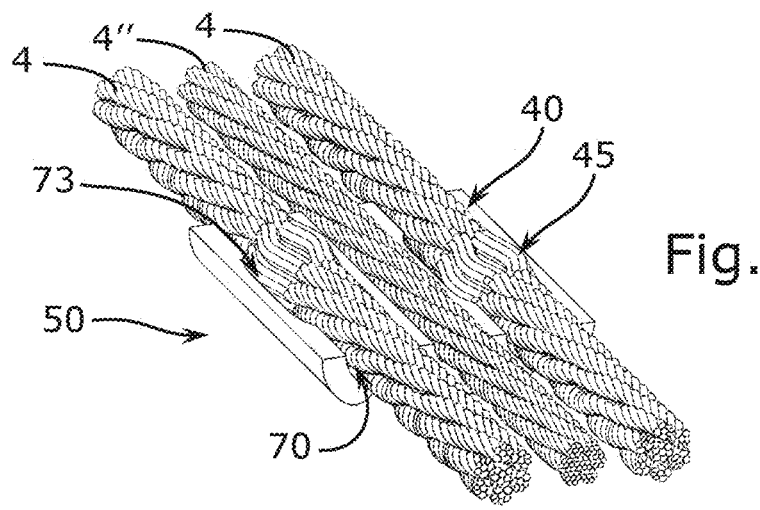
FIG. 13 a view of a part of the locking element according to this second embodiment.
Figure 14:
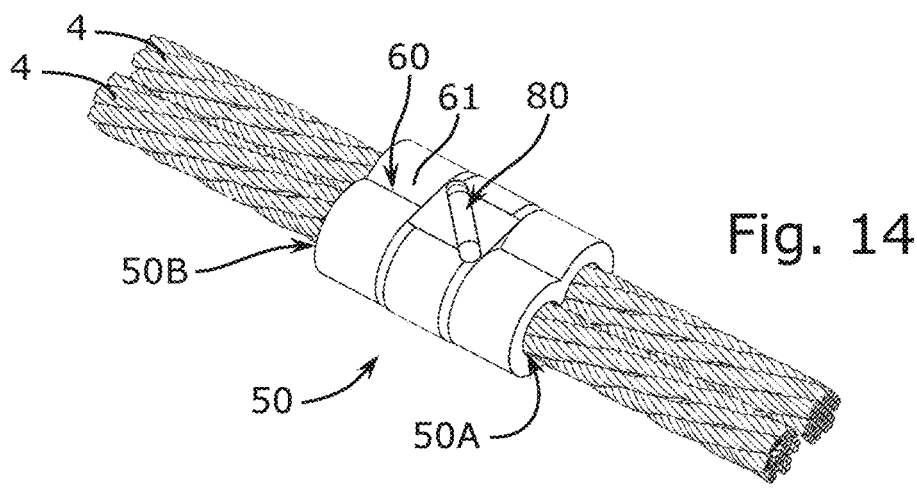
FIG. 14 an isometric view from above of a locking element according to a third embodiment of the invention.
Figure 15:
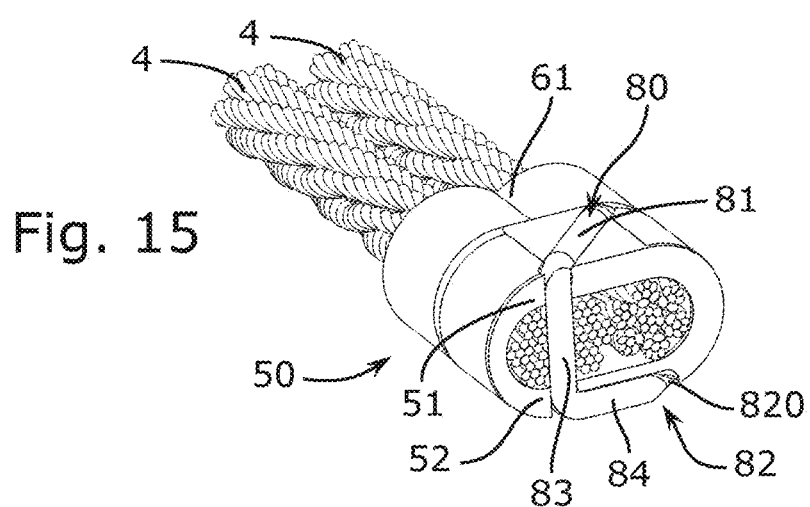
FIG. 15 a cross-sectional view of the locking element according to this third embodiment.
Figure 16:
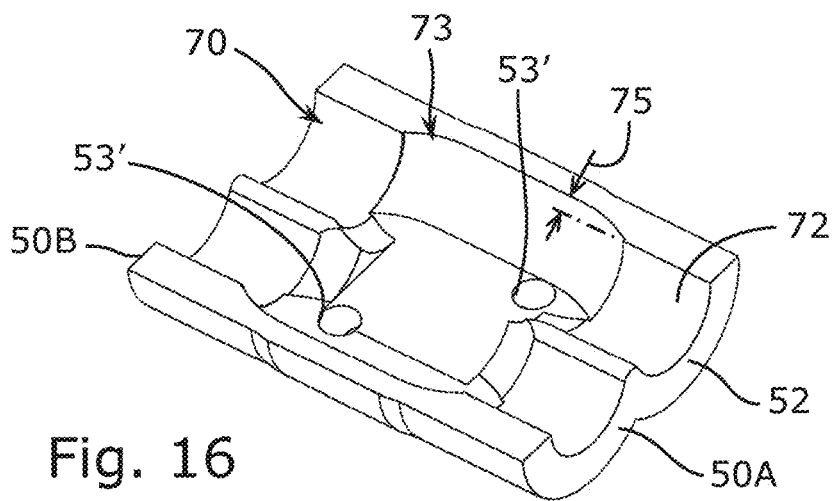
FIG. 16 a view of a portion of the locking element according to this third embodiment.
Figure 17:
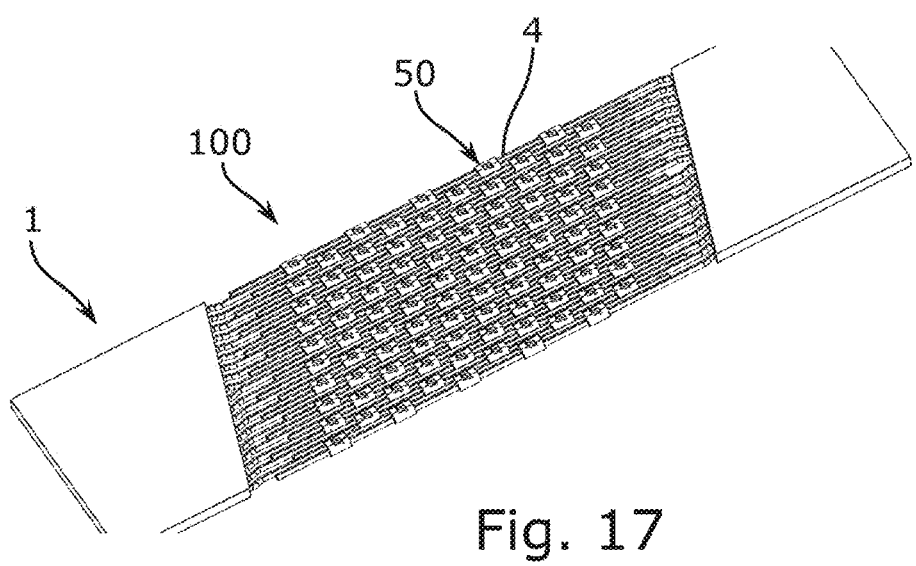
FIG. 17 a view of a portion of a conveyor belt join comprising locking elements according to this third embodiment.

As illustrated in FIGS. 6, 7, and 8, the locking elements 50 are used in combination to form a particular assembly. In particular, these locking elements 50 are used as part of a join 10 of a conveyor belt 1. Such conveyor belts 1 are used in particular in mines, quarries and other places where they are subjected to severe working conditions and high internal stresses.

The conveyor belt 1 extends along a longitudinal axis X' generally corresponding to its direction of travel along a conveyor. The conveyor belt 1 comprises a body 2 formed of a flexible material such as a vulcanizable elastomer, or a synthetic material, reinforced with a reinforcement 3 comprising cables 4', for example made of steel, embedded in the body 2. The forces taken up by the conveyor belt 1 are mainly longitudinal so that the cables 4' are arranged in the body 2 of the conveyor belt 1 in a manner extending axially and work in traction during the use of said conveyor belt 1.

The conveyor belt 1 comprises a first end edge 11' and a second end edge 12', from which a first end portion 11 and a second end portion 12 extend across the conveyor belt 1 and are connected together by a joining device 100 providing the join between the two end portions 11, 12. In the joining position, the end portion 11 and the second end portion 12 are vertically aligned, the first end edge 11' and the second end edge 12' being longitudinally opposite, preferably abutting. It will be noted in practice that, given the distances for conveying different materials or different products according to the uses in quarries or other places of use, a single conveyor belt 1 can be formed by joining several longitudinal conveyor belt portions connected together by a joining device 100.

The end portions 11, 12 are configured so that, in the joined position, the join at the joining device 100 is equal in thickness to the conveyor belt 1. In this way, the use of the joining device 100 does not create a local excess thickness at its end portions 11, 12, the thickness being constant. Such a feature is particularly important to avoid premature wear due to the passage of scrapers on the conveyor. In order to satisfy this constraint, the first end portion 11 and the second end portion 12 are thinned, in particular after having been stripped by a stripping operation, to ensure the placement of the joining device 100. This stripping preferably extends in thickness up to the cables 4', i.e., to a thickness corresponding to the thickness of the cables 4'.

The conveyor belt 1 houses the reinforcing cables 4' in its body 2. The conveyor belt 1 is structured so as to comprise, in the direction of its thickness a, a substantially central ply 1A that integrates the cables 4' and that is interposed vertically between two outer plies of flexible material of the body 2 devoid of reinforcement 3, namely: an upper part and a lower part of the body 2 of the conveyor belt 1.

Each of the cables 4' of the conveyor belt 1 extends longitudinally in the body 2 of the conveyor belt 1 continuously into the corresponding end portion where the loose, severed end of each cable 4' is located. The end portions 11, 12 are formed, in the longitudinal extension of the conveyor belt, of the central ply 1A integrating the cables and disrobed or stripped of the outer plies, i.e., stripped of the lower and upper layers of material normally located, over the rest of the conveyor belt outside the join 10, on either side of the central ply 1A. The thickness of the end portions 11, 12 corresponds to the thickness of the central ply 1A obtained after the stripping operation, and is preferably equal to an average diameter of the cables 4' or to the diameter of the cable 4' with the largest dimension. A perfect stripping of each cable corresponding to the complete removal of all the material of the body 2 surrounding the cables 4', and in particular the material of the body 2 between the cables 4', is therefore not necessary in this embodiment.

The joining device 100 providing the join between the two longitudinally aligned end portions 11, 12 comprises here two joining plates 101, 102 each sized to cover, over all or part of the width of the conveyor belt 1 and preferably over the entire width, the first end portion 11 and the second end portion 12 on the same side of the conveyor belt 1. The joining plates 101, 102 comprise a lower joining plate 101 straddling under the first and second end portions 11, 12 and an upper joining plate 102 positioned straddling over the first and second end portions 11, 12 so as to cover them. These joining plates 101, 102 each have a thickness complementary to that of the corresponding end portion configured to together fill the material void produced during the stripping step with the aim of obtaining a thinning of the first end portion 11 and of the second end portion 12. In this way, after joining, a flushness of the join 10 with the lower 1" and upper 1' surfaces of the conveyor belt 1, i.e., a constant thickness e of the conveyor belt 1, is obtained without relief. As already mentioned above, such a feature makes it possible to prevent premature wear due to the use of scrapers (not shown) located in the path of the conveyed materials and configured to scrape the upper surface 1' of the conveyor belt 1.

The first and second end portions 11, 12 of said conveyor belt 1 are gripped between, or enclosed between, vertically, the two joining plates 101, 102 which each create a material bridge between the first and second ends 11, 12. These joining plates 101, 102 are made of a flexible and elastic material, for example vulcanized rubber, or a synthetic material such as polyurethane. This is preferably the same flexible material as that constituting the body 2 of the conveyor belt 1.

In accordance with the invention, the joining device 100 comprises at least one assembly 150 of locking elements 50 attached to the first end portion 11 and the second end portion 12 of the conveyor belt 1, so as to connect at least part of the reinforcing cables 4' of the first end portion 11 of the conveyor belt 1 with at least part of the reinforcing cables 4' of the second end portion 12 of the conveyor belt 1.

To ensure that the two end portions of the conveyor belt 1 are joined together, the locking elements 50 are connected together in various ways.

Locking elements 50 are assembled vertically, in pairs, such that for each assembly 150 a first upper locking element 50 is configured to couple with a second lower locking element 50, connected together by fasteners 110, such a pair of lower and upper locking means 50 being configured to enclose at least one cable 4', preferably two adjacent cables 4'. As previously described in conjunction with the preceding figures, the first and second lower and upper locking elements 50 together form clamping jaws configured to enclose at least a portion of cable 4'.

In addition, a plurality of upper locking elements 50 are also connected together longitudinally by a cable 4 that forms a connecting cable for the join 10 and passes through a cavity 70 of each of said so-called upper locking elements 50. Similarly, a plurality of lower locking elements 50 are also connected together longitudinally by a connecting cable 4 that passes through a cavity 70 of each of said lower locking elements 50. In the context of a join 10 of the end portions 11, 12 of the conveyor belt 1, reinforced by cables 4', a longitudinally axial assembly 150 of a plurality of locking elements 50 connected together by a connecting or joining cable 4 straddling the two ends of said cables 4' to be connected of the conveyor belt 1 can be used. In this embodiment, a longitudinal assembly 150 of several upper locking elements 50 is coupled with a complementary lower longitudinal assembly 150, thus forming a plurality of jaws that enclose one of the cable ends 4' and another plurality of jaws that enclose the other of the cable ends 4' thus forming a connection.

A joining assembly 150' of a plurality of pairs of lower and upper locking means 50 as described above is obtained, said pairs of locking means being connected longitudinally, by a lower cable 4 successively connecting the lower locking elements 50, and by an upper cable 4 successively connecting the upper locking elements 50. Such a joining assembly is divided into two removable parts, specifically an upper part and a lower part.

By applying a configuration to the join 10 of a conveyor belt 1, and by multiplying such joining assemblies 150' arranged parallel to each other and evenly distributed over the join 10, it is then possible to ensure the joining of the two end portions of the conveyor belt 1 by connecting each cable end 4' of the first end portion 11 to another cable end 4' of the second end portion 12. In this embodiment, the joining assemblies 150' are integrated into the joining plates 101, 102, with the locking elements 50 being embedded in the soft, resilient material such as vulcanized rubber forming the associated joining plate 101, 102. The upper portions of the joining assemblies 150' of a single joining device 100 (upper locking elements 50 and upper connecting cables 4) are indeed easily integrated into the constituent material of the upper joining plate 102, and the lower portions of the joining assemblies 150' of a single joining device 100 (lower locking elements 50 and lower connecting cables 4) are indeed easily integrated into the constituent material of the lower joining plate 101.

Alternatively, they could be attached to these first and second end portions 11, 12, and then covered with a joining plate. However, such an embodiment presents less flexibility and imposes a greater thickness of the join thus made.

The fastening of the joining plates, lower 101 and upper 102, is carried out by fasteners 110 comprising a rod such as screw-nut fasteners. The fasteners 110 pass through the thickness and successively: a first of the two joining plates 101 or 102, then one of the two end portions 11 or 12, and lastly the second of the two joining plates 101 or 102. In this embodiment, the fasteners 110 are screws each comprising a head 111 and an anchoring section 112 provided with a thread, the joining plates 101, 102 comprising first interfaces 113 for cooperating with the heads 111 of the fasteners 110 and/or second interfaces 114 for cooperating with the anchoring sections 112 of the fasteners 110. The first and second interfaces 113, 114 are carried by the locking elements 50 integrated in the joining plates 101, 102. Thus, in this embodiment, the fasteners 110 serve a dual function to ensure, on the one hand, the fastening of the joining plates 101, 102 to each other with the end portions 11 or 12, and, on the other hand, to ensure the connection of a pair of locking elements 50 forming jaws to enclose one or more portions of cables 4'. In a particular configuration not illustrated here, the fasteners 110 can also form a clamping means 60 of a locking element 50 which would be formed by the combination of a pair of superimposed lower and upper locking elements 50 when each locking element 50 forming one of the jaws forms, or constitutes, supports 51, 52 as described above with one or more cavities 170 making it possible to accommodate therein a deformation of one of the cables 4' of the corresponding end portion 11, 12 of a conveyor belt 1. Such a configuration is also possible even if the lower and upper locking elements 50 with such cavities 170 enclose two cables, without necessarily a third central cable being present, the jaws then being merely supports 51, 52 of the same locking element 50, without these supports constituting locking elements 50 per se.

The first interfaces 113 each comprise a depression capable of accommodating a head 111 of one of the fasteners 110. The second interfaces 114 comprise a cylindrical tubular part 116, an inner cylindrical surface of which is able to cooperate with the anchoring section 112 of the fasteners 110, thanks here to a threading complementary to the threading of the anchoring section 112.

The fasteners 110 are arranged so as to pass through the cables 4' of the corresponding cable 4' of the associated end portion 11 or 12. Each pair of lower and upper locking means 50 has two screw-type fasteners 110 passing through each of the cavities 170 of the assembly, and the cable 4' housed therein. The fasteners are offset from a transverse axis Y' passing through the anchoring member 80 so as not to be transversely aligned, one of the two fasteners 100 being offset by one step toward the front, the other being offset by one step toward the rear. In this way, the transverse gauge of the locking and/or the assembly element can be reduced.

Each of the lower and upper locking elements 50 of the assemblies 150 comprise two transversely extending wings 54, which are configured to rest against adjacent connecting cables 4 of adjacent assemblies 150 on one side and the other. Preferably, this support at least partially envelops an outer surface portion of the cable so as to gain stability and minimize any wear at the interface with the cable 4'.

As the joining plates 101, 102, come from both sides of the end portions 11, 12 of the conveyor belt consisting of the central ply 1A which integrates the cables 4', it is not necessary to perfectly strip all the cables 4' of the end portions 11, 12. The join is made by implementing the following steps:

- stripping an upper part and a lower part of the body 2 of the conveyor belt 1 at the first end portion 11 and the second end portion 12 of the conveyor belt 1;
- placing the two joining plates 101, 102 each covering a separate side of the first and second end portions 11, 12 of the conveyor belt 1 so that the first and second end portions 11, 12 of said conveyor belt 1 are disposed between the two joining plates 101, 102;
- during this step of placement of the joining plates 101, 102, the joining assemblies 150' are placed concomitantly by coupling, in pairs, the upper locking elements 50 forming an upper jaw with the lower locking elements 50 forming a lower jaw, so as to connect the reinforcing cables 4' of the first end portion 11 to the reinforcing cables 4' of the second end portion 12;
- securing the join by positioning the fasteners 110 to fasten each pair of lower and upper locking elements 50 together.

Preferably, the pairs of lower and upper locking elements 50 are configured so as to be arranged in a generally staggered fashion. In this manner, they are not all aligned transversely to the transverse axis Y' of the conveyor belt 1.

The join assemblies 150' are also positioned so that each reinforcing cable 4' of the first end portion 11 or the second end portion 12 is connected by one of the joining assemblies 150', with the reinforcing cable 4' cable adjacent to a first side, and by another of the joining assemblies 150', with the reinforcing cable 4' cable adjacent to a second side, opposite the first side.

FIGS. 9 to 13 illustrate a locking element 50 according to a second embodiment. This locking element 50, made of metal, makes it possible to fasten three different cable strands or portions of cables, of which two cables are locked by an anchoring member 80 configured to occupy at least partially a portion of the corresponding intermediate part 73. Among these three cables, the locking element has a central cable 4" and two lateral cables 4.

The central cable 4" passes through the locking element 50 longitudinally and is permanently fixed in the hole it passes through by any means, such as bonding, welding or even molding of the metallic locking element 50 directly to the cable. This central hole opening on either side of the locking element 50 can be cylindrical (see FIG. 11) or different, for example ovoid (see FIG. 12), but other shapes are of course possible (oblong, etc.). The two lateral cables 4 each pass through the locking element 50, each corresponding portion 40 of cable 4 being housed in a separate cavity 70. These three portions of cable 4, 4" extend longitudinally generally in a parallel manner two by two.

Similarly to the first embodiment, the body of the locking element 50 is passed through from an entrance opening 50A to the other exit opening 50B for each of the two cavities 70 configured to receive a portion of cable. The body of the locking element 50 is formed by a monobloc part, so that the supports 51, 52 are integrally formed. Each of these cavities 70 is similar to that described with reference to the first embodiment. Thus, each of the two cavities 70 receiving one of the portions 40 of cables 4 comprises a widened intermediate or central part 73, which is disposed between, and in alignment with, the corresponding entrance 50A and exit 50B openings. The widened intermediate parts 73 of each of the two cavities 70 are longitudinally offset, that is to say they are not aligned along an axis Y transverse to the longitudinal axis X. This is to avow for a smaller overall size, but also to allow for an optimized position of the anchoring member 80, as will be discussed below.

The anchoring member 80 is a cleat here. The cleat 80 has a general "U" shape prior to fastening to the conveyor belt. A cleat 80 is formed from a monobloc rod, namely formed in one piece and preferably made of metal. The head 81 of the cleat 80 is formed from a central part of the substantially rectilinear monobloc rod, which is interposed between two lateral rod parts each forming a rod portion 83 configured to each penetrate one of the two portions 40 of cables 4 to be locked. Each rod connected to the head 81 by an elbow forms, in itself, an anchoring member 80 to penetrate one of the two widened intermediate parts 73 to create the deformation 45 of each of the two corresponding portions 40 of cables 4 and thus lock them, as in the first embodiment.

The portions 83 of the rods 80 have tips 820 at their ends extending away from the head 81 to facilitate their insertion through one each of two widened intermediate parts 73, to pass through the body of the locking element 50 vertically through its thickness.

On an outer side of the locking element 50 on the side of a first support 51 forming a top support, the locking element 50 has a first interface 510, such as a groove, for complementary accommodation of all or part of the head 81 of the cleat 80. On another outer side of the locking element 50 on the side of a second support 52 forming a top support, the locking element 50 has a second interface 520 such as a groove or two for accommodating all or part of the tips 820 of the cleat 80 that are bent or folded under the locking element 50 after having been inserted to lock the fastening of the cleat 80 once installed, and thus ensure that it cannot come loose during use of the conveyor belt 1. The bent tips 820 of the cleat 80 thus each form an anchoring section 84 of said anchoring member 80 ensuring the anchoring of said clamp 80 to the locking element 50 by making it possible to impede its removal and lock its assembly.

Whereas the rod portions 83 penetrate vertically into one of the two portions of cables 4 to be locked, the head 81 extends along a transverse component to connect the two cables 4, but at an angle, i.e., with a certain inclination with respect to the transverse axis, also demonstrating that the widened intermediate parts 73 of each of the two cavities are longitudinally offset. In addition to gaining in volume, it is apparent from such a configuration that, when tensile forces are applied to the two separate cables 4 in which the cleat 80 is anchored, this results in a rotational force of the cleat 80 about a vertical axis, which would have the effect of further constraining the deformation of the cable outwardly, locking the cables 4 all the better.

The widened intermediate parts 73 of each of the two cavities 70 are axially interposed between two generally cylindrical portions complementary to the cylindrical jacket of the corresponding cable portion, or even slightly smaller, these cylindrical portions forming opening portions each opening axially onto the entrance opening 50A and respectively the exit opening 508. A widened section of each widened intermediate part 73 has a larger cross-sectional dimension than that of the cylindrical portions that frame it. This increase in size, or widening, extends at least in part transversely with respect to the locking element 50, i.e., along the transverse axis Y perpendicular to the associated longitudinal axis X and to a vertical axis A of the rod of the anchoring member 80, thus creating a transverse deformation 45 of the initially cylindrical section of the portion 40 of the cable 4 generally along this transverse axis Y, in one direction and in the other. It should be noted that in some possible variants, the axis A might not be vertical.

In this second embodiment, the locking element 50 further comprises clamping means 60 for clamping the two supports 51, 52 to each other. As these supports 51, 52 are formed here in one piece, it is convenient to proceed with a crimping along all or part of the cylindrical end portions of each of the cavities 70. This crimping is visible from the outside by an impression 61 left on the locking element 50 after the clamping operation, here crimping.

A set of such locking elements 50 can be used, for example, to form a joining assembly participating in the joining of end portions of a conveyor belt. The central cable 4" is in this case preferably a connecting cable along which a plurality of locking elements are successively fastened, forming a longitudinal assembly. Such an assembly (not shown) of locking elements 50 is configured in this case to be attached in a manner straddling the first end portion 11 and the second end portion 12 of the conveyor belt 1, so as to connect at least part of the reinforcing cables 4' of the first end portion 11 of the conveyor belt 1 to at least part of the reinforcing cables 4' of the second end portion 12 of the conveyor belt 1.

In such a configuration, the central cable 4" of each locking element straddles the first and second end portions 11, 12, and the two lateral cables 4 are, on one side longitudinally of the assembly, a reinforcing cable 4' of one of the two end portions 11, 12 and, on the other side longitudinally of the assembly, a reinforcing cable 4' of the other of the two end portions 11, 12.

However, making such a join requires the complete stripping of the reinforcing cable portions constituting the end portions 11, 12 of the conveyor belt 1. Once the cables have been connected, it is possible to vulcanize the join so as to reform the body of the conveyor belt 1 around the reinforcement reconstructed by the join. It should be noted that vulcanization can also preferably be replaced by the use of two joining plates 101, 102, and/or the use of a cast resin. These alternatives make it possible to avoid a long and complex vulcanization step.

To facilitate the positioning of the locking elements 50, they could be designed in two distinct parts, forming one each of the two lower and upper supports 51, 52, such as jaws. To ensure the centering of the two grooves 71, 72 of each of the supports 51, 52, an added connecting element can be provided, for example an articulation between the two supports guaranteeing a perfect superposition of the supports and facilitating the positioning around the corresponding cable portions.

FIGS. 14 to 17 illustrate a locking element 50 according to a third embodiment which differs in essence from the second embodiment in that it does not have a central cable 4", and in that the two cavities 70 each receiving a cable communicate with each other so as to provide a single widened intermediate part 73. The locking element 50 has the form of a monobloc sleeve, i.e., the supports 51, 52 are also formed in one piece, but it makes it possible to guarantee the locking of two portions 40 of cable(s) 4 in the same cavity 70.

In such a configuration, the entrance 50A and exit 503 openings also communicate with each other. These entrance 50A and exit 50B openings are aligned with each other longitudinally in accordance with the reference axis X, and have a shape substantially complementary to the shape of the two cables, these being crimped in a manner similar to the second embodiment.

The widened intermediate part 73 has a widening 75 centered with respect to the cavity allowing each of the cables 4 to be able to extend, due to the insertion of the anchoring member 80 through its structure, into this space complementary to the local deformation or swelling of the gauge of the corresponding cable portion 4. The anchoring member 80 is a cleat similar to that described in conjunction with the second embodiment. In this example, since the widened intermediate part 73 is common for both cables 4, the widening 75 of the cavity 70 is provided for a given cable 4 on the side of the cavity opposite the other cable 4. For cables 4 with a diameter of 8 mm, each passed through substantially in the middle by a rod 83 with a diameter of 2.9 mm, each cable 4 will have a bulge on either side of the rod 83, this bulge being directed generally transversely with respect to the longitudinal reference axis X of the cavity 70, in one direction and in the other. The widened intermediate part 73 of the cavity 70 is then configured to have a transverse widening 75 configured to accommodate therein the bulge of one cable on one side, and the bulge of the other cable on the other side, each bulge 75 having a dimension corresponding to about 18% of the diameter D of the corresponding cable 4.

The cleat 80 has a head 81 that extends at an angle, i.e., with an inclination relative to the axes of the cables, also demonstrating that the bulges of the two cables are longitudinally offset relative to each other. The bulge of one cable is located on one side in the transverse widening 75 of the widened intermediate part 73 and, on the opposite side, the bulge is directed towards the other cable, or even comes into contact and rests thereagainst.

A set of such locking elements 50 can be used, for example, to form a joining assembly involved in the joining of end portions of a conveyor belt. In this case, of the two cables locked by each locking element 50, one of the two is one of the reinforcing cables 4 of one of the two end portions 11, 12, and the other of the two locked cables is a reinforcing cable 4' of the other of the two end portions 11, 12. In this embodiment, no connecting cables straddling the two end portions 11, 12 are used, such that the reinforcing cables of the perfectly stripped end portions 11, 12 become entangled in the join 10. This occurs moreover in an alternating manner and parallel to each other. The locking elements 50 are then arranged alternately and in an offset manner with respect to each other over the extent of the entanglement of the cable portions 4', the locking elements 50 connecting the cables two by two and preferably being spaced every two cables. Each pair of cables is preferably fastened together by at least three, preferably at least five, locking elements 50. Once the cables have been connected at the end portions 11, 12, the join can then be vulcanized so as to reform the conveyor belt body 1 around the reinforcement reconstructed by the join.

Naturally, the invention is described in the foregoing by way of example. It is understood that a person skilled in the art is capable of realizing various alternative embodiments of the invention without departing from the scope of the invention.

For example, it is understood that other fasteners, clamping means or anchoring members such as screws can be used, performing the same function. Furthermore, the vertical orientations of the fasteners and/or clamping means and/or anchoring members can be different.

Furthermore, described in relation to the figures is an anchoring member 80 formed by a rectilinear rod, a portion 83 of said rod 80 penetrating the widened intermediate part 73 and locally passing through the cavity 70 radially with respect to the axis X at the same time as it passes through the cable portion 40 to create the deformation when a portion 40 of cable 4 is housed in the cavity 70. In another configuration, it can be envisaged that this deformation is created without passing through the cable. In this case, the rod can be rectilinear, with a circular or rectangular cross-section, for example, and can be provided with a point 820 having a beveled edge which, when it is inserted, allows the portion 40 of the cable 4 to be moved locally to create the deformation 45.

With respect to a conveyor belt, the longitudinal direction is by convention and for convenience and clarity of disclosure throughout this description the longitudinal direction of the conveyor belt, and applies equally to the considered joining device as it is to be mounted on the conveyor belt. The transverse direction is the direction perpendicular to the longitudinal direction thus defined, regardless of the dimensions of the joining device considered individually.

In a particular configuration, not shown in the figures, the supports are not necessarily monobloc, so that all or part of the cavity can be formed by at least one connected part. For example, a first part of two supports, whether or not they are monobloc, can have or delimit a first through-hole having a cylindrical jacket, thus of constant diameter, and complementary end pieces can be provided to be placed at the longitudinal ends of this first through-hole by cooperating therein, these end pieces each having or delimiting a second through-hole defining the entrance and exit openings as well as the entrance and exit portions. The widened intermediate part would then be longitudinally defined between said end pieces and would have an inner diameter corresponding to the diameter of the first hole.

The supports can enclose the cable portion(s) directly as seen in the figures or also indirectly enclose the cable portion(s). This is the case, for example, if an intermediate piece, for example made of plastic, is placed between the groove of at least one of the metal supports and receiving the cable portion. Such a plastic part could be used as a consumable to preserve the wear of the locking element while making it possible to vary the friction coefficient. The connected part could be changed as it wears.

The cable(s), connecting and/or reinforcing, can also comprise merely strands, without necessarily comprising a core. Generally speaking, they comprise bundles of twisted wires. Preferably, the cables are metallic, i.e. made of metal wires.

It is emphasized that all of the features, as apparent to a person skilled in the art from the present description, the drawings and the appended claims, even if specifically described only in conjunction with other specified features, both individually and in any combinations, can be combined with other features or groups of features disclosed herein, provided this has not been expressly excluded and provided technical circumstances do not make such combinations impossible or meaningless.

The invention claimed is:

1. A joining device for at least one conveyor belt of the type extending along a longitudinal axis and comprising a body made of flexible material inside which a reinforcement comprising reinforcing cables extending at least in part axially is accommodated, the joining device being intended to connect at least a first and a second end portion of the conveyor belt, wherein the joining device comprises at least one assembly of at least two locking elements connected to each other by assembly means comprising at least one connecting cable, the assembly being intended to be attached to the first end portion and the second end portion of the conveyor belt, so as to connect at least some of the reinforcing cables of the first end portion of the conveyor belt to at least some of the reinforcing cables of the second end portion of the conveyor belt, and each locking element comprises at least two opposite supports configured to enclose at least a portion of an associated cable among the reinforcing cables and the connecting cable, the supports each having at least one groove together defining at least a part of a through-cavity for receiving at least the portion of the associated cable passing through the locking element between an entrance opening and an exit opening aligned in accordance with a reference axis, the cavity having a widened intermediate part between entrance and exit opening portions, radially widened relative to the entrance opening portion and the exit opening portion, and the locking element comprises at least one anchor configured to at least partially occupy a portion of the widened intermediate part of the cavity located in alignment with the entrance and exit openings, so as to locally create a radial deformation of the cross-section of the portion of the associated cable.

2. The joining device according to claim 1, further comprising at least two joining plates configured to cover a separate side each of the end portions of the conveyor belt so that the end portions of the conveyor belt are each disposed between the two joining plates, the joining plates being fixed together by fasteners arranged to pass respectively through one joining plate, one of the ends of the conveyor belt and then the other joining plate, each joining plate being made of a flexible and elastic material and comprising the assemblies of locking elements, embedded at least partially in the flexible and elastic material of the corresponding joining plate.

3. The joining device according to claim 2, wherein at least one the assembly means comprises at least one of the fasteners which are arranged to pass respectively through one joining plate, one of the ends of the conveyor belt and then the other joining plate.

4. The joining device according to claim 1, further comprising:
an upper longitudinal assembly of at least two upper locking elements among the locking elements, connected together by an upper connecting cable among the connecting cables to straddle the two ends of said reinforcing cables to be connected, and
a lower longitudinal assembly of at least two lower locking elements among the locking elements, connected together by a lower connecting cable among the connecting cables to straddle the two ends of said reinforcing cables to be connected, the upper locking elements of the upper longitudinal assembly being shaped to be assembled with the lower locking elements of the lower longitudinal assembly by forming together a joining assembly and to enclose at least part of the reinforcing cables of the first end portion of the conveyor belt and at least part of the reinforcing cables of the second end portion of the conveyor belt, the joining device comprising a plurality of joining assemblies arranged parallel to one another and configured to be evenly distributed over a joint of the first and second end portions of the conveyor belt connected by the joining device.

5. The joining device according to claim 4, wherein in an enclosed position of the reinforcing cables of the first end portion and the second end portion, the reinforcing cables are arranged parallel to each other, and parallel to the longitudinal reference axis of the portions of connecting cables locked with their corresponding locking element.

6. The joining device according to claim 1, wherein support parts of the locking element are configured to enclose at least the portion of a first cable among the reinforcing cables and the connecting cable, the locking element comprising a groove defining at least part of a through-cavity for receiving a second cable from the reinforcing cables and the connecting cable, the through-cavity having two axial end openings.

7. The joining device according to claim 1, wherein all or part of the locking elements comprise at least one clamping means to ensure clamping of the two supports relative to each other, the clamping means comprising at least one screw and/or cleat and/or rivet and/or crimp.

8. The joining device according to claim 7, wherein the clamping means comprises the anchor such that the anchor participates in the clamping of the two supports relative to each other.

9. The joining device according to claim 1, wherein the supports of at least some of the locking elements are formed in one piece.

10. The joining device according to claim 1, wherein the anchor of at least some of the locking elements comprises a rod portion configured to penetrate the portion of the cable, the anchor comprising at least one cleat and/or one screw and/or one rivet and/or one pin.

11. The joining device according to claim 1, wherein the portion of the associated cable comprises a structure of the type comprising wires, the anchor of at least some of the locking elements comprising a distal end, opposite a head, provided with a tip so as to penetrate at least in part into the associated cable by separating the wires from the structure of the associated cable.

12. The joining device according to claim 1, wherein at least a first of the two supports of at least some of the locking elements comprises at least one through-hole opening into the widened intermediate part of the cavity to allow the anchor to penetrate the widened intermediate part of the cavity.

13. The joining device according to claim 12, wherein the first of the two supports comprises at least one first interface comprising a depression or countersink, capable of accommodating a head of one of the anchors and a second of the two supports comprises at least one second interface with which an anchoring section of said anchor is capable of cooperating.

14. The joining device according to claim 1, wherein the entrance opening and/or exit opening portions of at least some of the locking elements locally have a sectional constriction configured such that the constriction has a diameter strictly smaller than a diameter of a cylindrical jacket of the associated cable.

15. The joining device according to claim 1, wherein the widened intermediate part of the cavity of at least some of the locking elements has a radial widening in a plane orthogonal to an axis of a rod portion of the anchor configured to penetrate the associated cable, the radial widening being greater than or equal to 10% of a diameter of the associated cable, and less than or equal to 50% of the diameter of the associated cable, on either side with respect to the cavity.

16. The joining device according to claim 1, wherein the entrance and exit opening portions of the cavity of at least some of the cable-receiving locking elements have a shape partially defining a cylindrical jacket configured to cooperate with a cylindrical jacket of the associated cable, the entrance and exit opening portions of the cavity each extending axially along a length greater than or equal to an axial length of the widened intermediate part of the cavity.

17. The joining device according to claim 1, wherein each locking element makes it possible to ensure the fastening of three different cable portions extending longitudinally in a generally parallel manner two by two, of which a central cable forming a connecting cable passes through the locking element longitudinally and two reinforcing cables to be blocked by an anchor are configured to occupy at least partially a portion of the corresponding intermediate part.

18. A joint of a conveyor belt extending along a longitudinal axis comprising a body made of flexible material inside which a reinforcement comprising reinforcing cables extending at least in part axially is housed, the conveyor belt comprising a first and a second end portion connected together by a joining device according to claim 1, wherein at least one assembly is attached to the first end portion and the second end portion of the conveyor belt, so as to connect at least part of the reinforcing cables of the first end portion of the conveyor belt to at least part of the reinforcing cables of the second end portion of the conveyor belt.

19. A method for producing a joint of a conveyor belt according to claim 18, wherein the method comprises:

stripping an upper part and a lower part of the conveyor belt body at the first end portion and the second end portion of the conveyor belt; and placing at least one assembly of locking elements so as to connect at least part of the reinforcing cables of the first end portion of the conveyor belt to at least part of the reinforcing cables of the second end portion of the conveyor belt.

20. The method according to claim 19, further comprising:

placing at least two joining plates, each covering a separate side of the first and second end portions of the conveyor belt, so that the first and second end portions of said conveyor belt are disposed between the two joining plates, wherein the joining plates are formed of vulcanizable material, and the step of placing the joining plates is concomitant with the step of placing at least one assembly of locking elements.

* * * * *